UNITED STATES PATENT OFFICE.

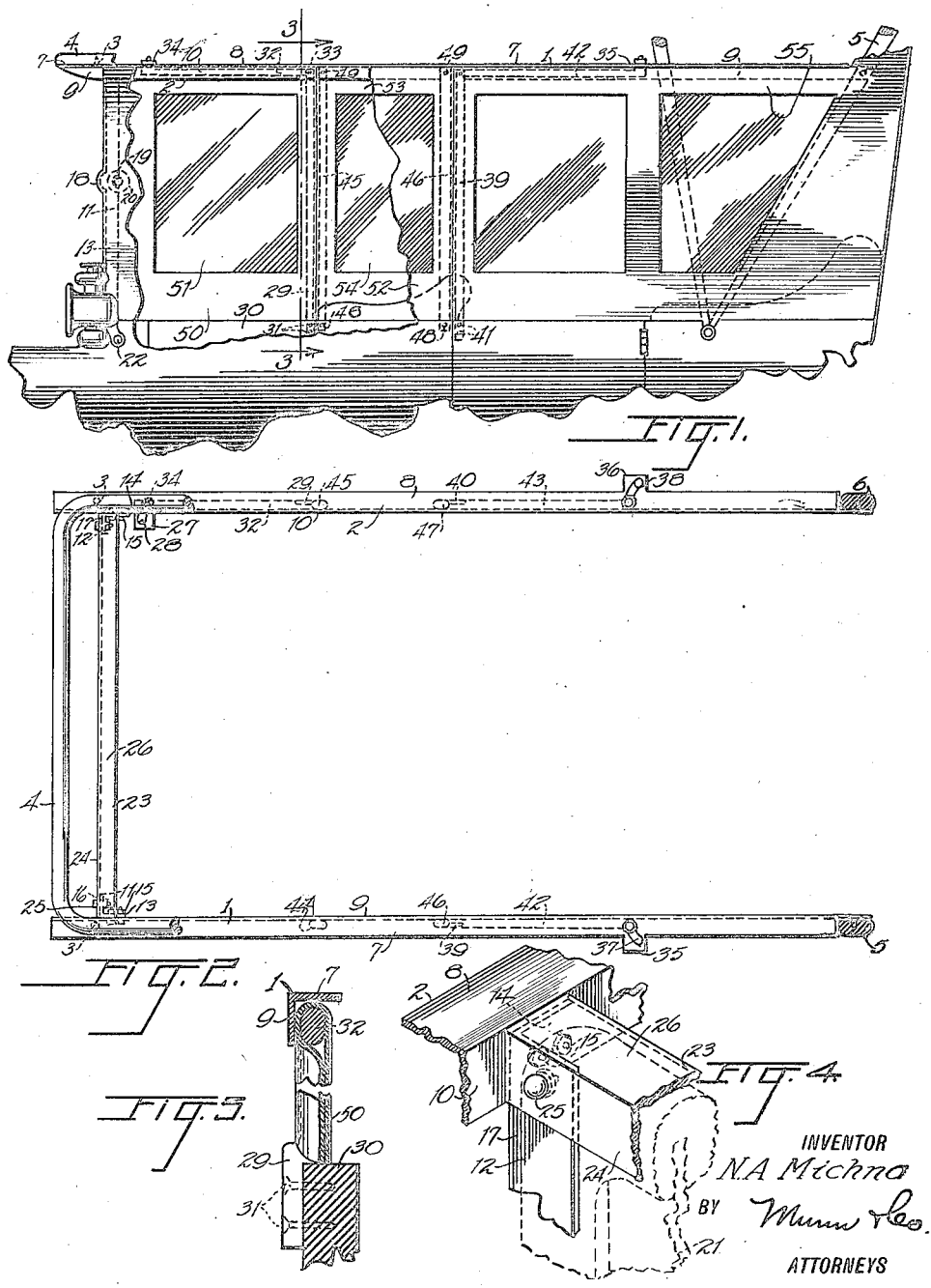

NICHOLAS A. MICHNA, OF CHICAGO, ILLINOIS.

WINTER INCLOSURE FOR AUTOMOBILES.

1,425,031. Specification of Letters Patent. Patented Aug. 8, 1922.

Application filed September 3, 1920. Serial No. 407,979.

*To all whom it may concern:*

Be it known that I, NICHOLAS A. MICHNA, a citizen of the United States, and a resident of Chicago, in the county of Cook and State of Illinois, have invented a new and useful Improvement in Winter Inclosures for Automobiles, of which the following is a full, clear, and exact description.

My invention relates to improvements in winter inclosures for automobiles, and it consists in the combinations, constructions and arrangements herein described and claimed.

An object of my invention is to provide a winter inclosure for automobiles or the like that can be easily and compactly packed for shipment.

A further object of my invention is to provide a device of the type described that can be readily attached to an automobile without altering the construction of the latter.

A further object of my invention is to provide a device of the type described that has hinged portions adjacent the doors of the automobile which are adapted to open and close with the doors.

A further object of my invention is to provide a device of the type described that is extremely light, strong and durable in structure and which is relatively cheap to manufacture.

Other objects and advantages will appear in the following specification and the novel features of the device will be particularly pointed out in the appended claims.

My invention is illustrated in the accompanying drawings forming part of this application, in which:

Figure 1 is a side elevation of an automobile with the device attached,

Figure 2 is a plan view of the device,

Figure 3 is a section taken on the line 3—3 of Figure 1,

Figure 4 is a perspective view of a portion of the device.

In carrying out my invention I make use of the ordinary type of automobile, preferably the Ford car, which has the customary foldable top. I then provide a pair of horizontally disposed angle irons 1 and 2 which are secured by means of wood screws 3 or the like to the front bow 4 and to the rear bows 5 and 6 of the foldable top. The angle irons 1 and 2 are so positioned that they have one of their sides 7 and 8 respectively horizontally disposed, and their other sides 9 and 10 of the angle irons 1 and 2 respectively depending from the inner edges of the sides 7 and 8. Portions of the horizontal sides 7 and 8 are cut away from the rear ends of each of the angle irons 1 and 2 to facilitate the attachment of the angle irons to the bows 5 and 6.

Another pair of vertically extending angle irons 11 and 12 have their outer sides 13 and 14 respectively secured to the depending sides 9 and 10 of the angle irons 1 and 2 by means of bolts 15, and which are positioned adjacent and on each side of the windshield 21 so that their other sides 16 and 17 are parallel to and bear against the front of the windshield. Substantially midway between the ends of each of the angle irons 11 and 12 and in the sides 16 and 17, is a raised portion 18. Directly in back of and in alinement with the raised portions is a recess 19 in each of the sides 13 and 14 of the angle irons 11 and 12 respectively. This construction permits the free movement of the upper hinged portion of the windshield 21. The lower ends of the angle irons 11 and 12 are secured by means of a bolt 22 to the body of the car. A horizontally disposed angle iron 23 extending between the angle irons 1 and 2 has its vertically disposed side 24 secured to the sides 16 and 17 of the angle irons 11 and 12 by means of bolts 25. The horizontally disposed side 26 of the angle iron 23 lies in the same plane as the sides 7 and 8 of the angle irons 1 and 2. It will thus be seen that the sides 16, 17 and 24 of the angle irons 11, 12 and 23 which bear against the front of the windshield 21, and the other sides 13, 14 and 26 of the same angle irons 11, 12 and 23 respectively which bear on the sides and top of the windshield 21, form an effective wind and waterproof construction.

Adjacent the angle iron 12 is a segment 27 of the angle iron 2 which has been bent out and up into alinement with the side 8 of the angle iron 2 and through which an arcuate slot 28 is cut (see Figure 2). A vertically extending oval-shaped rod 29 is secured to the swinging free end of the front door 30 of the car by means of wood screws 31 (see Figure 3). A second horizontally disposed oval-shaped rod 32 has one of its ends secured to the upper end of the rod 29 in a "half-lap" joint by means of a rivet 33 and has its other end fashioned in a collar which carries a vertically threaded bolt that is adapted to be slidably held in the slot 28 by means of the nut 34 screwed thereon.

Two segments 35 and 36 are positioned directly above the hinges of the rear doors of the car and are formed integral with the sides 7 and 8 of the angle irons 1 and 2 and lie in the same plane. A pair of arcuate slots 37 and 38 are cut in the segments 35 and 36 and extend into the sides 7 and 8 of the angle irons 1 and 2. A pair of vertically extending oval-shaped rods 39 and 40 are secured to their respective doors by means of wood screws 41. Secured to the top of the rods 39 and 40 are two horizontally disposed rods 42 and 43 and which have their other ends slidably secured in the slots 37 and 38. With this construction it is obvious that the frame work attached to the swinging doors and also to the angle irons 1 and 2, when in closed position are entirely covered by the horizontal sides 7 and 8 of the angle irons 1 and 2, whereby the entrance of rain into the interior of the car is prevented.

Adjacent to and disposed between the vertical rods 29, 39 and 40 and secured to the non-movable portion of the body by means of wood screws 48, are four upright oval-shaped rods 44, 45, 46 and 47, which have their upper ends secured by means of rivets 49 to the outer faces of the depending sides 9 and 10 of the angle irons 1 and 2.

A curtain 50, having a window 51 therein has its front end riveted to the lateral side 17 of the angle iron 12 and extends back and is secured to the upright rod 29 and the horizontal rod 32 by any means, as for instance stitching. Secured to the sides 16 of the angle iron 11 is a second curtain 52 having windows which extends back and is fastened to the upright oval-shaped rod 46. Another curtain 53 carrying a window 54 is secured to the upright 45 and 47. Two other curtains 55 and 56 which are situated on either side of the car are secured to the uprights 39 and 40 respectively and extend to the rear of the car where they are sewed or secured in any suitable manner. A plurality of windows are also provided in these curtains.

From the foregoing description of the various parts of the device the operation thereof may be readily understood. The construction of the inclosure is so compact that the passage of wind or water into the car is reduced to a minimum while at the same time entrance into and out of the car by a person is accomplished with ease, due to the fact that portions of the inclosure which are adjacent the doors of the car are operatively connected to them and can therefore open and close with them. It is obvious from the foregoing description that the device is very practical and simple and having few moving parts is therefor not likely to get out of order easily.

As stated above the construction of the device is so simple that it can be taken apart and compactly packed and shipped to its destination whereupon the purchaser can attach the device to his automobile by himself.

Minor changes may be made in the construction of the device without departing from the spirit and scope of my invention. I therefore consider such modifications and changes as my own.

I claim:

1. In an automobile construction, a horizontal frame member comprising a pair of angle irons, said angle irons having one of their sides disposed in a horizontal plane and their other sides disposed in a vertical plane, the vertically disposed sides being adjacent one another, a second angle iron extending at right angles to said first named angle irons and disposed therebetween and rigidly secured thereto, a pair of vertically disposed angle irons, each being rigidly secured to one of said first named angle irons at its point of junction with said second named angle iron, and auxiliary frames pivotally carried by said first named angle irons, said frames comprising two bars rigidly connected at their adjacent ends, one of said bars being hinged to said horizontal frame member and adapted to swing in a horizontal plane, and the other bar being vertically disposed and adapted to swing in a vertical plane.

2. In an automobile construction, a horizontal frame member comprising a pair of angle irons, said angle irons having one of their sides disposed in a horizontal plane and their other sides disposed in a vertical plane, the vertically disposed sides being adjacent to one another, a second angle iron extending at right angles to said first named angle irons and disposed therebetween and rigidly secured thereto, a pair of vertically disposed angle irons, each being rigidly secured to one of said first named angle irons at its point of junction with said second named angle iron, auxiliary frames pivotally carried by said first named angle irons, said frame comprising two bars rigidly connected at their adjacent ends, one of said bars being hinged to said horizontal frame member and arranged to swing in a horizontal plane and the other bar being vertically disposed and adapted to swing in a vertical plane, and means for mounting said horizontal frame at its rearward end to the canopy support of a motor vehicle.

NICHOLAS A. MICHNA.